(12) United States Patent
Barbu et al.

(10) Patent No.: US 12,557,054 B2
(45) Date of Patent: *Feb. 17, 2026

(54) METHOD FOR DELAY SPREAD ACQUISITION FOR TA VALIDATION

(71) Applicant: Nokia Technologies Oy, Espoo (FI)

(72) Inventors: Oana-Elena Barbu, Aalborg (DK); Nuno Manuel Kiilerich Pratas, Gistrup (DK); Daniela Laselva, Klarup (DK); Gerhard Schreiber, Korntal Munchingen (DE)

(73) Assignee: Nokia Technologies Oy, Espoo (FI)

( * ) Notice: Subject to any disclaimer, the term of this patent is extended or adjusted under 35 U.S.C. 154(b) by 398 days.

This patent is subject to a terminal disclaimer.

(21) Appl. No.: 18/272,273

(22) PCT Filed: Mar. 24, 2021

(86) PCT No.: PCT/US2021/023820
§ 371 (c)(1),
(2) Date: Jul. 13, 2023

(87) PCT Pub. No.: WO2022/154820
PCT Pub. Date: Jul. 21, 2022

(65) Prior Publication Data
US 2024/0073841 A1    Feb. 29, 2024

Related U.S. Application Data

(63) Continuation-in-part of application No. 17/149,064, filed on Jan. 14, 2021, now Pat. No. 11,570,736.

(51) Int. Cl.
*H04W 56/00* (2009.01)
*H04L 27/26* (2006.01)

(52) U.S. Cl.
CPC ..... *H04W 56/0045* (2013.01); *H04L 27/2605* (2013.01)

(58) Field of Classification Search
None
See application file for complete search history.

(56) References Cited

U.S. PATENT DOCUMENTS

| | | |
|---|---|---|
| 11,570,736 B2 | 1/2023 | Kiilerich Pratas et al. |
| 2020/0015263 A1 | 1/2020 | Huang et al. |

(Continued)

OTHER PUBLICATIONS

Nokia et al., "Discussion on aspects specific to CG based SDT," 3GPP TSG-RAN WG2 Meeting #112, R2-2009350, Elbonia, Nov. 2-13, 2020.

(Continued)

*Primary Examiner* — Anh Vu H Ly
(74) *Attorney, Agent, or Firm* — McCarter & English, LLP

(57) ABSTRACT

An apparatus configured to: receive a downlink signal; determine whether a TA stored at the apparatus is valid based, at least partially, on a reception timing of the received downlink signal and a delay spread value; and initiate small data transmission with a pre-configured uplink resource based, at least partially, on the determination that the TA is valid. An apparatus configured to: transmit, to a UE, a configuration comprising information related to TA validation for the UE, wherein the information comprises at least one of: an indication of a value configured to indicate a fraction of a cyclic prefix length of a symbol for reception of an uplink transmission from the UE, or a delay spread value; transmit a downlink signal; and receive a SDT based, at least partially, on the fraction of the length of the cyclic prefix, the transmitted downlink signal, and the delay spread value.

21 Claims, 10 Drawing Sheets

(56) References Cited

U.S. PATENT DOCUMENTS

| | | | |
|---|---|---|---|
| 2020/0029326 A1 | 1/2020 | Wang et al. | |
| 2020/0322981 A1* | 10/2020 | Choe | H04L 5/0053 |
| 2021/0235407 A1* | 7/2021 | Zhang | H04W 74/004 |
| 2021/0337625 A1* | 10/2021 | Tsai | H04W 76/30 |
| 2022/0225257 A1* | 7/2022 | Laselva | H04W 56/0095 |
| 2024/0224209 A1* | 7/2024 | Lee | H04W 76/30 |

OTHER PUBLICATIONS

Ericsson, "Details of CG based SDT," 3GPP TSG-RAN WG2 #112e, Tdoc R2-2009964, Nov. 2-13, 2020.

Intel Corporation, "Handling of Configured grant for SDT," 3GPP TSG RAN WG2 Meeting #112-e, R2-2008995, Nov. 2-13, 2020.

Hu, S. et al., "On Time-of-Arrival Estimation in NB-IoT Systems," arXiv:1711.03832v1, 2019 IEEE Wireless Communications and Networking Conference (WCNC), Marrakesh, Morocco, 2019, pp. 1-6.

Xu, W. et al., "Maximum likelihood TOA and OTDOA estimation with first arriving path detection for 3GPP LTE system," Transactions on Emerging Telecommunications Technologies 2014.

Kim, Ha Yang, "Modeling and Tracking Time-Varying Clock Drifts in Wireless Networks," A Thesis Presented to The Academic Faculty of Georgia Institute of Technology, Aug. 2014.

* cited by examiner

METHOD FOR DELAY SPREAD ACQUISITION FOR TA VALIDATION

RELATED APPLICATION

This application was originally filed as Patent Cooperation Treaty Application No. PCT/US2021/023820, filed Mar. 24, 2021, and is a continuation-in-part of U.S. patent application Ser. No. 17/149,064, filed Jan. 14, 2021, which is hereby incorporated by reference in its entirety.

BACKGROUND

Technical Field

The example and non-limiting embodiments relate generally to communications and, more particularly, to the use of a timing alignment in scheduling uplink transmission.

Brief Description of Prior Developments

It is known, for uplink transmission, to validate the timing advance based on the variation of reference signal received power between two time instances.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
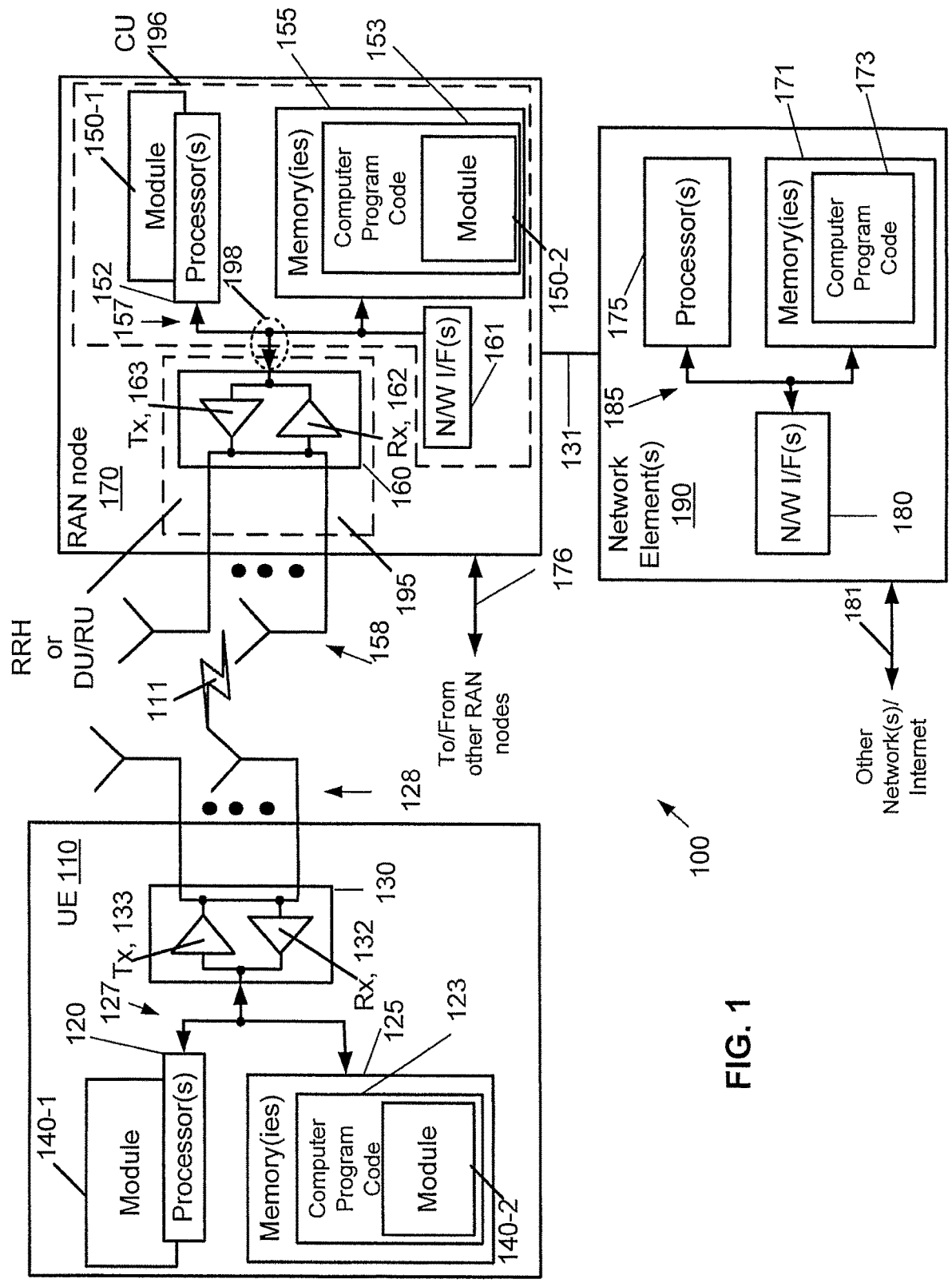
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
AWGN additive white Gaussian noise
AS access stratum
BLER block error rate
BW bandwidth
CG configured grant
CG-SDT configured grant-small data transfer
CIR Cox Ingersoll Ross
CQI channel quality indicator
CS compressive sensing
CSI channel state information
CU central unit
EDT early data transmission
DU distributed unit
eMBB enhanced mobile broadband
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HARQ hybrid automatic repeat request
HO handover
I/F interface
IoT Internet of Things
I-RNTI inactive RNTI
L1 layer 1
LARS least angle regression algorithm
LTE long term evolution
MAC medium access control
MCS modulation and coding scheme
MIMO multiple input, multiple output
MIoT mobile Internet of Things
MME mobility management entity
mMTC massive machine type communication
NB-IOT narrowband Internet of Things
ng or NG new generation
ng-eNB or NG-eNB new generation eNB
NR new radio
N/W or NW network
OFDM orthogonal frequency division multiplex
PCG pre-configured grant
PDCP packet data convergence protocol
PDP power delay profile
PHY physical layer
PSS primary synchronization signal
PUR periodic uplink resources
PUSCH physical uplink shared channel
RA random access
RACH random access channel
RAN radio access network
RDS relevant delay spread
RF radio frequency
RLC radio link control
RNAU RAN-based notification area update
RNTI radio network temporary identifier
RRH remote radio head
RRC radio resource control
RS reference signal
RSRP reference signal received power
RU radio unit
Rx receiver
SDAP service data adaptation protocol
SDT small data transmission
SGW serving gateway
SI system information
SIB system information block
SINR signal-to-interference plus noise ratio SMF session management function
SSB synchronization signal block
SSS secondary synchronization signal
TA timing advance
TDM time division multiplex
TO timing offset
TOA time of arrival
TRR transmission and reception point
Tx transmitter
UE user equipment (e.g., a wireless, typically mobile device)
UL uplink
UPF user plane function
URLLC ultra reliable low latency Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to enabling a UE in a radio resource control (RRC) inactive state to perform Small Data Transmission (SDT) over a pre-configured physical uplink shared channel (PUSCH) resource while the UE has a valid timing advance (TA). Example embodiments of the present disclosure may relate to computing of relevant channel metrics required for TA validation.

In cellular systems, a TA may be used to compensate for the propagation delay difference(s) of UEs located at different distance(s) from a base station. In other words, the use of TA by UEs may allow for time alignment between uplink transmissions such that a base station receives all uplink transmissions during a same time period, even though the propagation delay associated with various UEs may differ. For example, when transmissions from UEs are time multiplexed, it may be important that the end of a transmission burst of a UE that is far from a base station does not overlap with the start of the transmission burst of a UE that is about to transmit and is located closer to the base station. Accordingly, the UE that is farther away may be asked by the network to 'advance' its uplink transmission in time relative to its observed downlink time, i.e. may receive/use a TA. In another example, for systems relying on/using orthogonal subcarriers and cyclic prefix (e.g. systems like LTE and NR), the frequency multiplexing of two uplink transmissions may need to be received with (almost) the same timing at a base station. Accordingly, similar to the TDM example above, a TA adjustment may be used to compensate for propagation delay differences. In both cases, transmissions made with an incorrect/invalid TA may cause problems for the receiving base station.

3GPP Rel-17 includes a work item entitled "NR small data transmissions in INACTIVE state" [RP-193252]. A motivation for this work item is to avoid the signaling overhead and delay associated with the transition of a UE from RRC_INACTIVE to RRC_CONNECTED states in order to perform a short data transmission (SDT), as the RRC_INACTIVE state was introduced in order to allow transition of UEs with infrequent data transmission to a state with minimum signaling overhead and power consumption. A stated objective of the work item is, for the RRC_INACTIVE state, transmission of UL data on pre-configured PUSCH resource(s) (i.e. reusing the configured grant type 1) when TA is valid.

Example embodiments of the present disclosure may relate to the configured grant (CG)-SDT mode for enabling SDT. In Rel-17, three different "modes" are supported for enabling SDT: 2-step RACH, "2-step RA SDT"—the MsgA PUSCH is used to transmit the SDT payload; 4-step RACH, "4-step RA SDT"—the Msg3 PUSCH is used to transmit the SDT payload; and transmission of UL data on pre-configured PUSCH resources, "CG-SDT"—Configured Grant-based resources of type 1 can be used by the UE to transmit the SDT payload when it has a valid TA. Example embodiments of the present disclosure may relate to the process of TA validation.

In 3GPP RAN2-111e, the following agreements were made, related to SDT: Small data transmission with RRC message is supported as baseline for RA-based and CG based schemes; RRC-less can be studied for limited use cases (e.g. same serving cell and/or for CG) with lower priority; Context fetch and data forwarding with anchor re-location and without anchor re-location will be considered. FFS if there are problems with the scenario "without anchor relocation"; From RAN2 perspective, stored "configuration" in the UE Context is used for the RLC bearer configuration for any SDT mechanism (RACH and CG); The 2-step RACH or 4-step RACH should be applied to RACH based uplink small data transmission in RRC_INACTIVE; The uplink small data can be sent in MSGA of 2-step RACH or msg3 of 4-step RACH; Small data transmission is configured by the network on a per DRB basis; Data volume threshold is used for the UE to decide whether to do SDT or not. FFS how we calculate data volume. FFS if an "additional SDT specific" RSRP threshold is further used to determine whether the UE should do SDT; UL/DL transmission following UL SDT without transitioning to RRC_CONNECTED is supported; When UE is in RRC_INACTIVE, it should be possible to send multiple UL and DL packets as part of the same SDT mechanism and without transitioning to RRC_CONNECTED on dedicated grant. FFS on details and whether any indication to network is needed.

In 3GPP RAN2-112e, the following agreements were made, related to SDT: The configuration of configured grant resource for UE uplink small data transfer is contained in the RRCRelease message. FFS if other dedicated messages can configure CG in INACTIVE CG. Configuration is only type 1 CG with no contention resolution procedure for CG; The configuration of configured grant resource can include one type 1 CG configuration. FFS if multiple configured CGs are allowed; A new TA timer for TA maintenance specified for configured grant based small data transfer in RRC_INACTIVE should be introduced. FFS on the procedure, the validity of TA, and how to handle expiration of TA timer. The TA timer is configured together with the CG configuration in the RRCRelease message; The configuration of configured grant resource for UE small data transmission is valid only in the same serving cell. FFS for other CG validity criteria (e.g. timer, UL/SUL aspect, etc.); The UE can use configured grant based small data transfer if at least the following criteria is fulfilled (1) user data is smaller than the data volume threshold; (2) configured grant resource is configured and valid; (3) UE has valid TA. FFS for the candidate beam criteria; From RAN2 point of view: An association between CG resources and SSBs is required for CG-based SDT. FFS up to RAN1 how the association is configured or provided to the UE. Send an LS to RAN1 to start the discussion on how the association can be made. Mention that one option RAN2 considered was explicit configuration with RRC Release message; A SS-RSRP threshold is configured for SSB selection. UE selects one of the SSB with SS-RSRP above the threshold and selects the associated CG resource for UL data transmission.

Example embodiments of the present disclosure may relate to enabling SDT while a UE is in an RRC_INACTIVE state. The RRC_INACTIVE state was introduced in 3GPP NR Rel-15 to complement the existing states, RRC_CONNECTED and RRC_IDLE, with the goal of lean signaling and energy-efficient support of NR services. While the RRC_INACTIVE state was conceived particularly for massive machine type communication and/or mobile Internet of Things (mMTC/MIoT) services [see TR 22.824], it may be used to efficiently deliver small/infrequent traffic of enhanced mobile broadband (eMBB) and/or ultra-reliable low-latency (URLLC) services as well.

In the 5G NR RRC state machinery with RRC state transitions, the RRC_INACTIVE state may enable a UE to more quickly resume a connection and start transmission of small or sporadic data with a much lower initial access delay and associated signaling overhead, when compared to the RRC_IDLE state. This may be due to the reduced control signaling required for requesting and obtaining the resumption of a suspended RRC connection, which may result in UE power saving.

A UE in RRC_INACTIVE state may be able to achieve similar power savings as in RRC_IDLE state by benefiting from, for example, a much larger period of physical downlink control channel (PDCCH) monitoring (e.g. paging) and relaxed measurements compared to the RRC_CONNECTED state. Furthermore, compared to keeping the UE in RRC_CONNECTED state, the new state may minimize mobility signaling, both to the radio access network (RAN) (e.g. RRC measurement reporting, handover (HO) messages) and to the core network (e.g. to/from the access and mobility management function(s) (AMF)). When a UE is moved to RRC_INACTIVE state, via an RRC Connection Suspend message, the UE Access Stratum (AS) context (referred to as UE Inactive AS Context), which is necessary for the quick start of the connection, is maintained both at the UE side and RAN side, and it is identified by the UE identifier, i.e. Inactive-RNTI (I-RNTI).

The transition from RRC_CONNECTED state to RRC_INACTIVE state may be triggered by the gNB with the transmission of a RRCRelease message, which may include suspend configuration information (such as I-RNTI, RAN-PagingCycle, RAN-NotificationAreaInfo, and/or timer t380, which refers to the timer that controls when the periodic RAN-based notification area update (RNAU) procedure should occur at the UE).

It may be noted that establishment of the RRC_CONNECTED state and resumption of the RRC_CONNECTED state from the RRC_INACTIVE state may involve data transfer from the UE to the network. It may be noted that the release of a UE from RRC_CONNECTED state to the RRC_IDLE state and the suspension of the UE from RRC_CONNECTED state to the RRC_INACTIVE state may involve expiration of an RRC state transition timer and/or data inactivity. It may be noted that rejection, causing transition from the RRC_CONNECTED state to the RRC_INACTIVE state or the RRC_IDLE state may involve occurrence of an overload or failure case.

Figure 2:
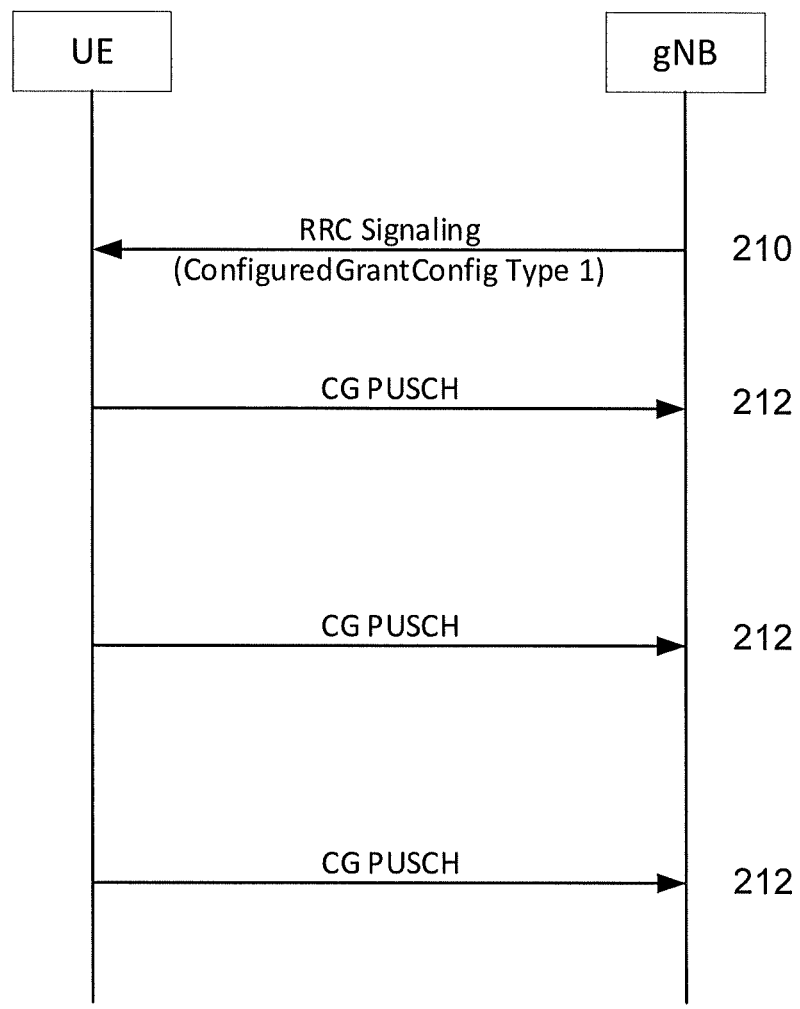
FIG. 2 is a flowchart illustrating features as described herein.
Figure 3:
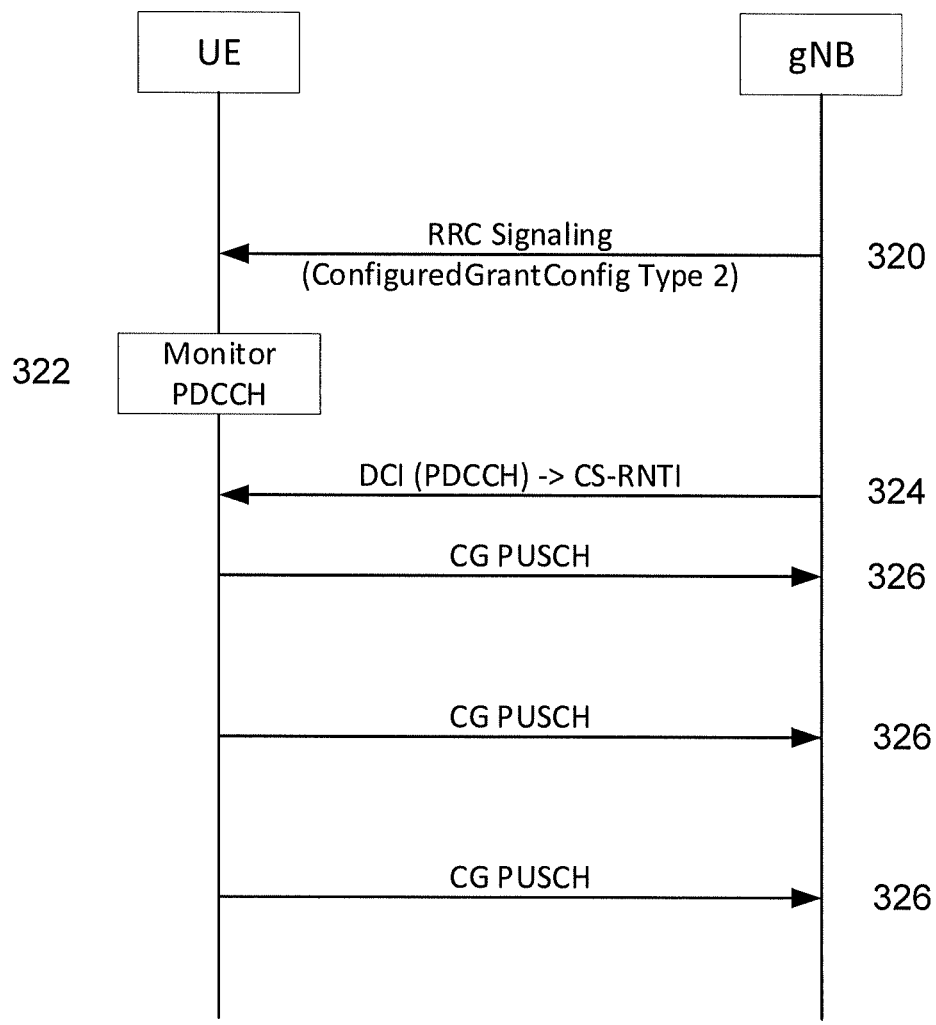
FIG. 3 is a flowchart illustrating features as described herein.
Figure 6:
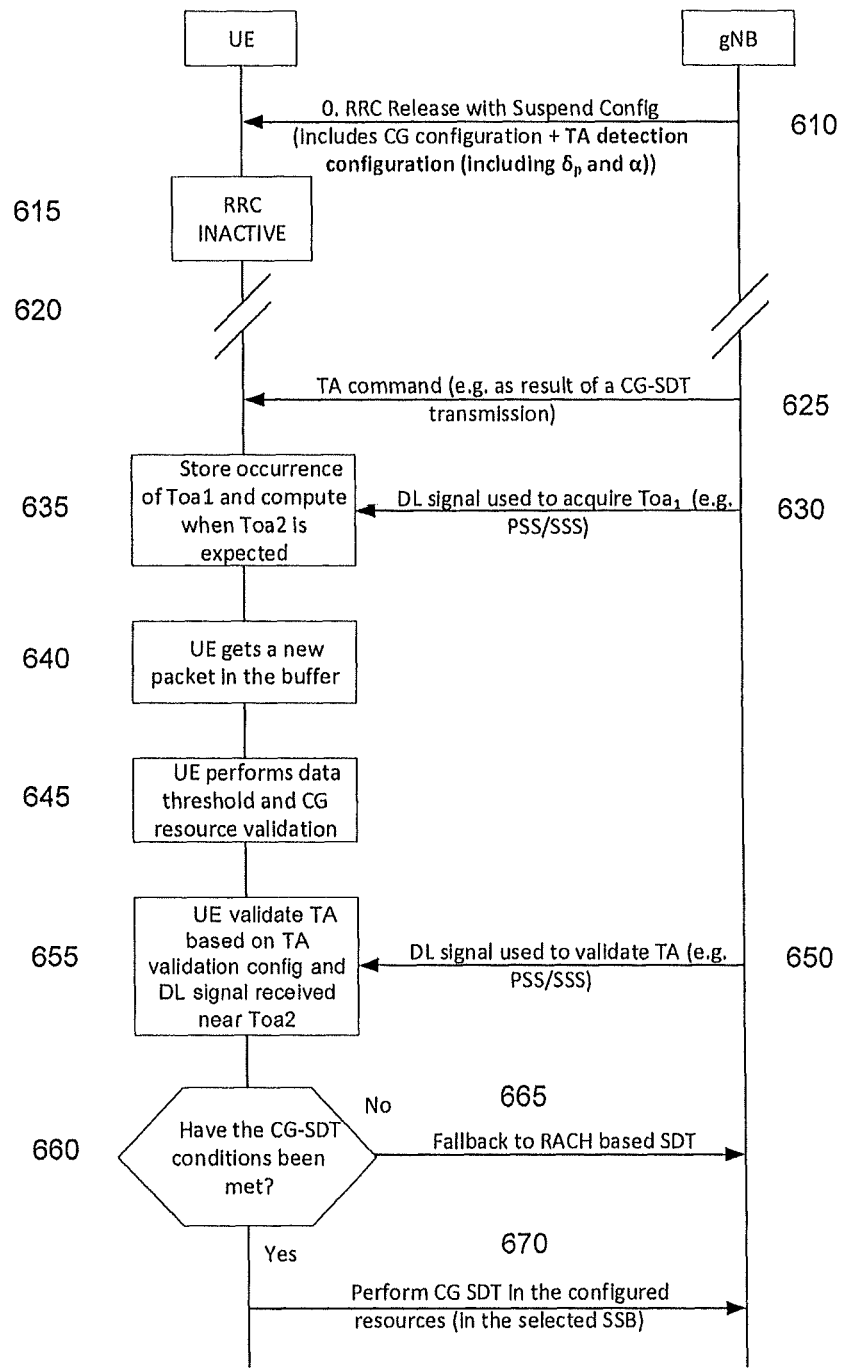
FIG. 6 is a flowchart illustrating features as described herein.

Referring now to FIGS. 2 and 3, illustrated are examples of configured grant operation in NR. In NR, it may be possible to configure uplink transmissions without the need to transmit a dynamic grant corresponding to each UL transmission occasion. The configuration of these uplink resources, also referred to as Configure Grant (CG) PUSCH resources, may happen according to two possible schemes. The actual uplink grant may either be configured via RRC (type 1, see FIG. 2) or provided via a combination of RRC and PDCCH (addressed to CS-RNTI) (type 2, see FIG. 3) [38.331, ConfiguredGrantConfig], as depicted in FIG. 6.

Referring now to FIG. 2, illustrated is an example of type 1 configured grant operation in NR. At 210, the gNB may transmit RRC signaling to the UE according to ConfiguredGrantConfig type 1. This signaling may include configuration of the CG PUSCH resources, including periodicity and starting time. At 212, the UE may transmit using the CG PUSCH resources configured according to the RRC signaling.

Referring now to FIG. 3, illustrated is an example of type 2 configured grant operation in NR. In type 2, the CG PUSCH resources may be partly configured via RRC signaling, while the actual starting time may be triggered via PDCCH. At 320, the gNB may transmit RRC signaling to the UE according to ConfiguredGrantConfig type 1. At 322, the UE may monitor PDCCH. At 324, the gNB may transmit downlink control information (DCI) to the UE over PDCCH. This DCI may include a channel state information radio network temporary identifier (CS-RNTI). This DCI may be configured to signal the actual starting time for configuring the CG PUSCH resources. At 326, the UE may transmit using the CG PUSCH resources configured according to the RRC signaling and the DCI.

In example embodiments of the present disclosure, preconfigured configured grant (PCG) resources may be configured and transmitted while UE is in INACTIVE state.¹ Such resources may be configured for the UE using dedicated signaling. However, enabling small data transmission (SDT) using such PCG resources, thus extending the usage of the UE's PCG-SDT, may require maintenance of a valid Time Alignment (TA). In RAN2-112e, as noted above, it was agreed that a new TA timer for TA maintenance, specified for configured grant (CG) based SDT in RRC_INACTIVE, should be introduced, and the TA timer should be configured together with the CG configuration in the RRCRelease message. However, the procedure for verifying the validity of TA, the criteria for TA validity, and how to handle expiration of TA timer were not defined. It was also agreed that the UE may use CG based SDT if at least the following criteria is fulfilled: (1) user data is smaller than the data volume threshold; (2) configured grant resource is configured and valid; (3) UE has valid TA. However, the candidate beam criteria was not defined. If TA validity is not established, a UE may not attempt CG based SDT transmission.

The non-expiration of the TA timer, by itself, is not a sufficient condition to validate the TA of a UE, as the configured timer duration does not reflect the UE's mobility conditions; therefore, the UE can become time misaligned before the TA timer expires due to UE mobility. It may also be noted that the UE may be still time aligned (i.e. the TA may be valid) even when/after the TA timer expires.

In the example of narrow band Internet of Things (NB-IOT) periodic uplink resources (PUR), TA validation may be based on reference signal received power (RSRP). More specifically, TA validation may be based on the difference between the RSRP value measured at the time a PUR transmission has to be made, and the RSRP value measured at the time the UE had a valid TA (i.e. reference RSRP). Whenever the observed RSRP variation is above/greater than the configured delta increase/decrease threshold(s), the UE may determine that it no longer has a valid TA, and therefore cannot use the PUR for uplink transmission.

Figure 4:
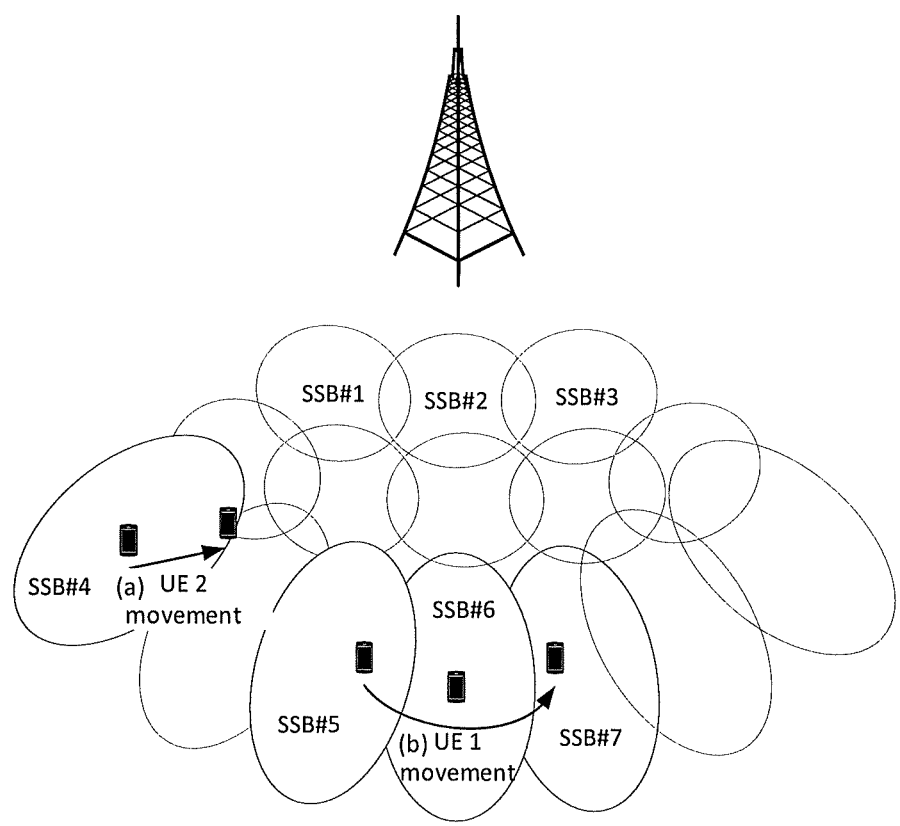
FIG. 4 is a diagram illustrating features as described herein.

In NR, this RSRP-based TA validation criteria might not be sufficient for determining TA validity due to characteristic(s) associated with the NR's beam-based operation. Referring now to FIG. 4, illustrated are two examples in which beamforming may disrupt measured RSRP, but in such a way that RSRP-based TA validation would not make it possible to ascertain if the UE still has a valid TA. In other words, in examples (a) and (b), it may not be possible for the UE to determine, based on the observation/measurement of RSRP, if the UE is still time aligned (i.e. has a valid TA).

The ellipsis of FIG. 4 may represent the synchronization signal block (SSB) coverage projected to the ground.

In example (a) of FIG. 4, UE2 moves within the same SSB beam (i.e. SSB #4) closer to the gNB (thereby reducing the pathloss), but farther away from the center of the beam formed by SSB #4 (i.e. where the beamforming gain is the highest). This movement by UE2 may result in a net zero variation of the RSRP, due to a pathloss decrease and beamforming gain decrease (i.e. the decrease in the pathloss may counteract the decrease in the beamforming gain such that RSRP does not vary). Because the RSRP does not vary, the UE may not detect that the TA might no longer be valid.

In example (b) of FIG. 4, UE1 moves between different SSB beams (i.e. SSB #5 to SSB #6 to SSB #7) while maintaining the same distance to the gNB, which may result in the UE observing a variation on the measured RSRP while still keeping a valid TA. Accordingly, the UE may determine that the TA is no longer valid, based on the observed RSRP, even when the TA is, in fact, valid (i.e. due to the maintained distance between the UE and the gNB, the uplink propagation delay might not have changed).

The examples of FIG. 4 are nonlimiting examples in which RSRP-based TA validity detection may not be suitable in a NR system due to the multi-beam scenarios. Example embodiments of the present disclosure may provide methods for more robust detection of the TA misalignment in NR for CG-based SDT.

U.S. application Ser. No. 17/149,064, which is hereby incorporated by reference in its entirety, discloses in an example embodiment a network-controlled method that enables a UE, before performing its configured grant based small data transmission (CG-SDT), to determine whether its TA setting is still valid. In the example embodiment, UE may be able to estimate if the TA is valid based on the synchronization signal block (SSB) time drift observed by the UE upon performing downlink synchronization with its serving cell/transmission and reception point (TRP). The SSB time drift may reflect the UE movement relative to the serving TRP; a small SSB time drift may indicate/relate to limited UE movement, which may indicate that the TA is valid. The SSB time drift-based metric may allow the UE to validate its TA by estimating if the UE's potential CG-SDT transmission would fall within a fraction of the orthogonal frequency division multiplex (OFDM) symbol's cyclic prefix upon reception in the serving TRP. The metric for TA validation may be expressed as follows:

$$|SSB\_time\_shift| \leq \alpha T_{CP}$$

α may be a network (NW) controlled parameter used in TA validation. When α<1, α may reflect/express/indicate the fraction of the CP (Cyclic Prefix) that may be occupied by the typical UL PDP/RDS (Power Delay Profile/Relevant Delay Spread) in the cell based on the network knowledge of the radio channel. RDS may be understood as a delay range in which a defined percentage of the total channel energy lies. SSB_time_shift may reflect/express/indicate the time shift in the DL reference signals (SSB), i.e. the timing difference between the time instant where an SSB was expected to be received (excluding the UE's clock drift) and the time instant when it was actually received.

The a parameter may represent the typical UL PDP/RDS (e.g. the cell average UL PDP/RDS). However, the actual UE's UL PDP/RDS may be expected to vary depending on the UE's current propagation conditions. An invalid TA may increase the block error rate (BLER) associated with the decoding of a CG-SDT PUSCH transmission, as illustrated in FIG. 5, which, from the perspective of the UE, may in turn induce latency as well as additional power expenditures (e.g. due to the need of sub-sequent hybrid automatic repeat request (HARQ) retransmissions).

Figure 5:
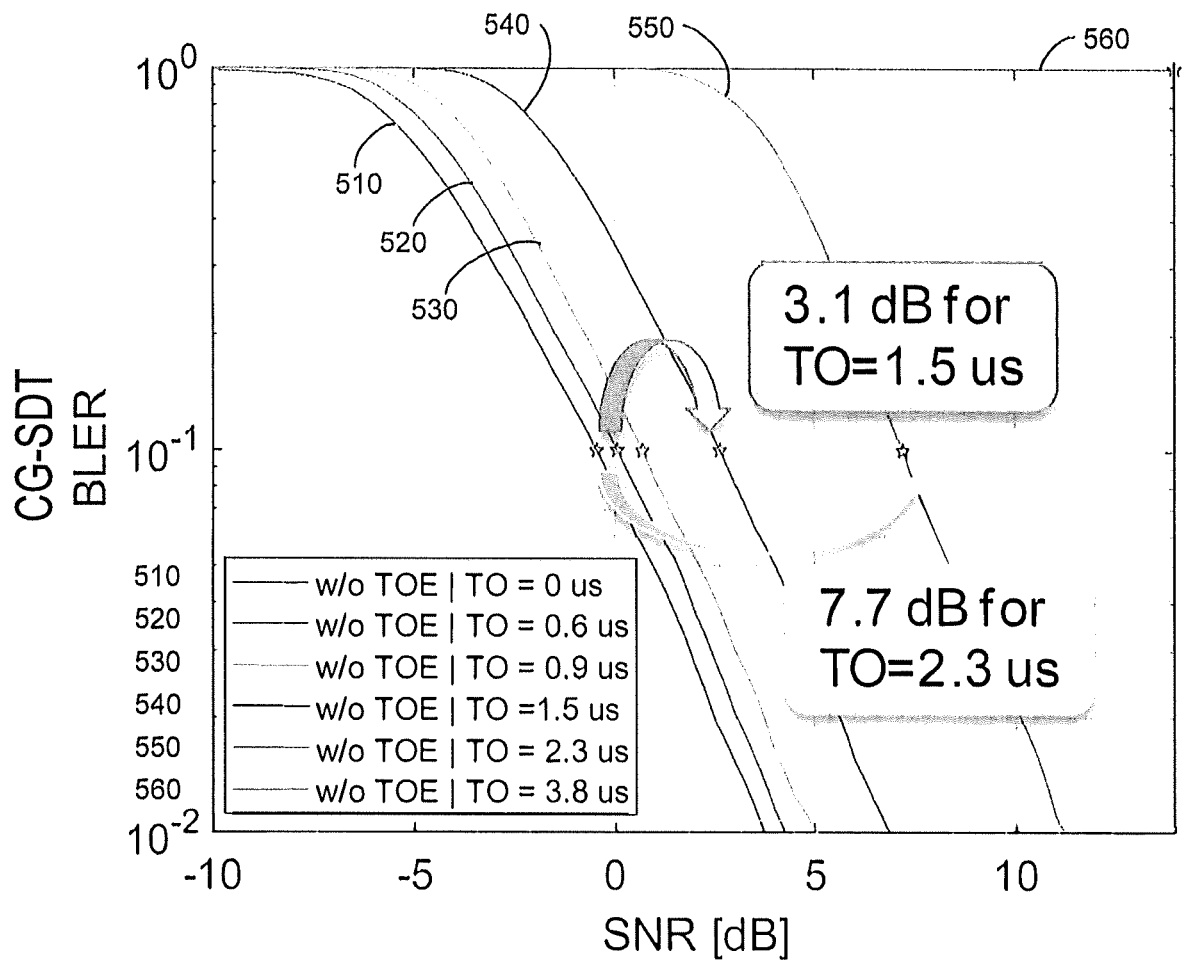
FIG. 5 is a diagram illustrating features as described herein.

Referring now to FIG. 5, illustrated are examples of PUSCH decoding performance impacts due to magnitude of the Timing Offset (TO). In other words, FIG. 5 illustrates examples of the effect of a signal being received with or without a timing offset (e.g. dues to TA misalignment with the network or due to drift of the TX UE's clock). It may be noted that whenever the TA is not valid, a TO may be present upon the reception of the PUSCH transmission at the TRP. In addition, the provided results might not consider timing offset compensation at the TRP (which may incur additional complexity at the TRP and therefore cannot be assumed to be always present).

In the example of FIG. 5, there is no timing offset applied to the signal for 510, and there is no degradation for the CG-SDT BLER target of $10^{-1}$. In 540 the timing offset is 1.5 us and, due to that timing offset, there is a degradation of 3.1 dB for the same CG-SDT BLER target of $10^{-1}$. For higher timing offsets (such as 2.3 us in 550) the performance degradation is 7.7 dB for the same CG-SDT BLER target of $10^{-1}$. For 560, the CG-SDT BLER is 100%, regardless of the SNR, due to the high timing offset of 3.8 us.

Example embodiments of the present disclosure may involve the use of TA validation criteria, applied at the UE, that is aware of/influenced by the UE's current propagation conditions, or indicators of those conditions.

As described above, when a UE is in RRC_INACTIVE state, the interactions with the network may be quite limited, and as such it may be difficult for the network to gather enough information to allow it to indicate a tailored a for each UE configured for CG-SDT. Therefore, in an example embodiment, the a chosen by the network may be based on the aggregate statistics from the observation from multiple UEs, and may be chosen such that it provides a high level of detection of when the TA is invalid (true positives), while reducing the number of false positives.

Example embodiments of the present disclosure may involve UE enhancement of the TA validation metric described in U.S. application Ser. No. 17/149,064 by introducing a PDP/RDS "correction" term, i.e. $\Delta_{dp}$:

$$|SSB\_time\_shift| \leq \min(T_{CP}-\Delta_{dp}, \alpha T_{CP})$$

Example embodiments of the present disclosure may describe how the term $\Delta_{dp}$ is generated. Example embodiments of the present disclosure may describe how the term $\Delta_{dp}$ may be applied at the UE for enhancing the TA validation metric based on the observed propagation conditions. A technical effect of example embodiments of the present disclosure may be to make the approach of U.S. application Ser. No. 17/149,064 more robust.

The power delay profile (PDP) may be obtained via cross-correlation of the received signal with the copy of the transmitted signal and computation of the absolute value of the resulting samples. However, this method may only work well in noiseless scenarios and may be limited by the sampling resolution of the receiver. Studies have shown that the delay estimation is highly sensitive to both noise and bandwidth, and yields delay estimates that deviate widely from the true values, as a result of neglecting the contribution of noise on the resulting channel power profile and/or limiting the search space to a resolution no finer than the inverse of the bandwidth.

Other methods for obtaining the PDP may rely on an exhaustive search of an oversampled and overly dimensioned delay space, which may make them computationally intensive and unscalable to large bandwidth (BW) or multiple input, multiple output (MIMO) systems.

Example embodiments of the present disclosure may enable and/or enhance the TA validation method described in U.S. application Ser. No. 17/149,064. However, it should be noted that the example embodiments of the present disclosure are not limited to practice with that TA validation method; use with other TA validation methods may be possible.

In an example embodiment, the UE may evaluate/enable/determine/use an enhanced TA validation metric by applying a correction factor to the metric proposed in U.S. application Ser. No. 17/149,064, based on the delay spread $\Delta_{dp}$, as follows:

$$|SSB\_time\_shift| \leq \min(T_{CP}-\Delta_{dp}, \alpha T_{CP})$$

According to this enhanced metric, the UE may compare the absolute value of the determined SSB_time_shift with the minimum of: the length of the cyclic prefix ($T_{CP}$) associated with the sub-carrier spacing of its CG-SDT transmission minus the PDP/RDS correction term ($\Delta_{dp}$); and the guard period associated with the fraction ($\alpha$) of the length of the cyclic prefix ($T_{CP}$) associated with the sub-carrier spacing of its CG-SDT transmission. The UE may determine that it has a valid TA if the TA validity condition is met.

Example embodiments of this enhanced metric may ensure that the TA validation metric indicated by the network is always valid. However, for the cases where the a indicated by the network is too optimistic (i.e. too large a value) when compared with the UE's current propagation conditions (i.e. when $\alpha T_{CP} > \Delta_{dp}$), the UE may enforce a more conservative TA validation by applying such an enhanced metric.

Example embodiments of the present disclosure may involve computation of a relevant (radio) delay spread (RDS), i.e. a delay range of a relevant channel energy. This computed/estimated RDS may serve as $\Delta_{dp}$ in the TA validation metric.

In an (alternative) example embodiment, a relevant threshold for the RDS may be configured by the NW via signaling, according to U.S. application Ser. No. 17/149,064.

In an example embodiment, the RDS may be initialized using a baseline cross-correlation-based power detection, and may be refined using a compressive sensing (CS) solver that detects relevant components within the initial RDS. The CS solver may rely on/operate by: selecting a coarse but wide delay search space using the initial RDS, and implementing a novel projection matrix that maps the time-domain received signals onto the selected delay search space.

An example embodiment may comprise a combination of the following steps: use power detection methods to initialize the delay search space; extend and discretize the initialized delay search space by a selected delay-tail, and sample the resulting space with a selected resolution; project the time-domain signal onto a delay-domain representation via a matrix obtained from the transmit sequence and the extended and discretized search space; use the projection matrix and the time domain samples as input to a CS solver of choice to obtain the relevant power taps; and retrieve the min and max power taps and compute a refined RDS as requested by the NW via signaling, e.g. according to U.S. application Ser. No. 17/149,064.

Example embodiments of the present disclosure may assume that the UE is required, by the network, to perform TA validation according to U.S. application Ser. No. 17/149, 064.

In an example embodiment, the UE may receive the CG-SDT configuration, which may include the configuration for TA validation, which may include the maximum SSB_time_shift (e.g. α) to apply to the standardized TA validation condition |SSB_time_shift|≤αT$_{CP}$ (as proposed in U.S. application Ser. No. 17/149,064). The UE may then determines that it has a valid TA, only if the TA validity condition, at least partially corrected with the Δ$_{dp}$ factor, is met:

|SSB_time_shift|≤min($T_{CP}$-Δ$_{dp}$,α$T_{CP}$)

This TA validity condition may ensure that an uplink transmission that would be started/transmitted using the current TA value, and undergoing the same (or lower) delay spread, will be received at the network side within the length of the cyclic prefix, and therefore would not introduce inter-symbol interference to its transmission, nor interfere the reception of other UEs UL in nearby resources. The TA validity condition might not be met where a channel delay spread is higher than the applied cyclic prefix (e.g. due to severe changes in the propagation channel) and/or where the UE moves sufficiently far away from its initial position that the applied TA is no longer valid. This later cause may be accounted for in the |SSB_time_shift| term in the left side of the inequality.

In an alternative example embodiment, the UE may apply the following TA validity condition:

|SSB_time_shift|≤$T_{CP}$-Δ$_{dp}$

This alternative TA validity condition ignores the suggestion from the network, i.e. in the case where α$T_{CP}$<Δ$_{dp}$. This alternative TA validity condition might be considered where the UE PUSCH transmission would still fall within the OFDM symbol cyclic prefix.

In an alternative example embodiment, the UE may further adjust the TA validity condition as follows:

|SSB_time_shift|≤α"$T_{CP}$ where

α"=min(1-Δ$_{dp}$/$T_{CP}$,α)

This TA validity condition may ensure that the applied α" takes into account a more accurate UE-specific propagation environment (i.e. when α$T_{CP}$>Δ$_{dp}$) while at the same time ensuring that the limit indicated by the network (i.e. a) is respected.

Figure 7:
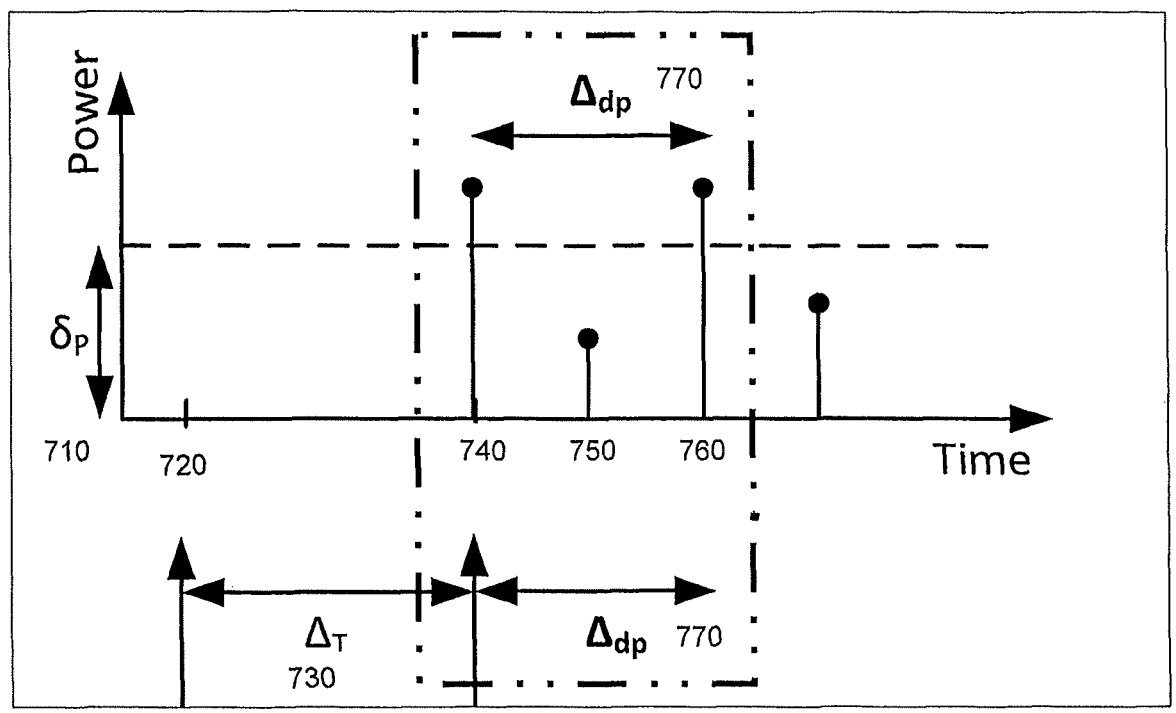
FIG. 7 is a diagram illustrating features as described herein.

In an alternative example embodiment, rather than receiving a CG-SDT configuration that may include the configuration for TA validation that may include the maximum SSB_time_shift (e.g. α), the UE may receive from the network, in the configuration for TA validation, an additional parameter: a relative power threshold (e.g. δ$_P$) to max power observed in reference signal PDP spectrum, as depicted in the procedure illustrated in FIG. 6. The parameter δ$_P$ may indicate the amount of power that the UE should consider in the calculation of Δ$_{dp}$, as depicted in FIG. 7.

Referring now to FIG. 6, illustrated is an example signaling flow between a UE and a gNB for performing CG-SDT. The illustrated procedure includes validation of the TA according to example embodiments of the present disclosure. At 610, the UE may receive from the gNB/ network a CG-SDT resource configuration (e.g. as part of the RRCRelease message), which may also include a TA validation configuration. Additionally or alternatively, the CG configuration may include an indication of whether the UE may perform TA validation based on an example embodiment of the present disclosure. Such an indication may be in response to (prior) receipt at the network of an indication that the UE is capable of performing TA validation based on, for example, reception timing of a DL signal. The TA validation configuration may include a fraction (α) of the length of the cyclic prefix. α may comprise a value less than one, as the value may reflect the fraction of the cyclic prefix that may typically be occupied by the UL PDP in the (serving) cell, based on network knowledge of the radio channel. α may be a network controlled parameter used in TA validation. In an example embodiment, the TA validation configuration may include a value for α or may include an indication of α. The TA validation configuration may also include a relative power threshold (δ$_P$). δ$_P$ may be a network controlled parameter used in TA validation. In an example embodiment, the TA validation configuration may include a value for δ$_P$, an indication of δ$_P$, or a correction to a value for by known at the UE.

The δ$_P$ parameter may be realized as a mapping established between the UE's measured SSB's RSRP and the δ$_P$ to be used (e.g. if the serving SSB's RSRP is x dBm, then the δ$_P$ should be y dB). Such mapping between SSB's RSRP and the δ$_P$ may either be tabulated in the specification, or a default δ$_P$ may be provided in the specification. The UE may apply either network controlled or autonomously determined corrections to δ$_P$. If corrections are network controlled, then the UE may interpret the signaled δ$_P$ in TA validation configuration as a correction to an absolute δ$_P$ value stored in UE. No signaling from the network may be required for δ$_P$ corrections in a case of autonomous UE calculation. Methods for determining correction(s) to δ$_P$ may be UE/gNB vendor specific.

Alternatively, the δ$_P$ may be related to/determined based on modulation and coding scheme (MCS), channel quality indicator (CQI), channel state information (CSI), signal-to-interference plus noise ratio (SINR) levels, the cell load, and/or the sub-carrier spacing observed by the UE. In this case, no signaling for δ$_P$ may be required from gNB in a TA validation configuration information element. The method(s) employed by the UE to determine δ$_P$ may be UE vendor specific.

Alternatively, the δ$_P$ may be indicated explicitly to the UE in the TA validation configuration. Method(s) to determine δ$_P$ may be left to vendor-specific implementation.

Referring now to FIG. 6, at 615, the UE may transition to the RRC_INACTIVE state. The UE may then enter a discontinuous reception (DRX) state, 620.

At 625, the gNB may transmit to the UE a TA command. For example, the TA command may be transmitted as a result of a CG-SDT transmission. The UE may awaken from DRX to receive the TA command.

At 630, the UE may receive a DL signal used to acquire a first time of arrival (Toa$_1$). For example, the DL signal may comprise a primary synchronization signal (PSS) or a secondary synchronization signal (SSS). At 635, the UE may store the occurrence of Toa$_1$ of PSS or SSS and compute/ determine when a second time of arrival (Toa$_2$) at which another PSS or SSS may be expected to be received. The Toa$_2$ and the time at which another PSS or SSS is actually received (e.g. 650) may be used to calculate SSB_time_shift for later use at 655. Note that the UE may need to receive at least two instances of SSS/PSS in order to be able to compute SSB_time_shift.

At 640, the UE may get/receive a new packet in the buffer. In other words, the UE may receive a trigger for initiating an SDT procedure.

At 645, the UE may verify/determine whether all conditions (besides having a valid TA setting) for CG-SDT transmission are valid. In an example embodiment, the UE may determine whether the SDT payload to be transmitted is above or below one or more data threshold(s) for SDT, may determine whether the configured grant resources are valid, etc.

At 650, the UE may receive a DL signal that may be used to validate TA. For example, the DL signal may comprise a primary synchronization signal (PSS) or a secondary synchronization signal (SSS). The DL signal may comprise assistance data. At 655, the UE may attempt to validate the TA based on the TA validation configuration (e.g. received at 610) and a DL signal received near $Toa_2$ (e.g. calculated at 635). For example, the TA validation configuration may be according to an example embodiment of the present disclosure that takes into account $\Delta_{dp}$ and, optionally, $\delta_P$. For example, the TA validation configuration may indicate that the TA validation condition:

$$|SSB\_time\_shift| \leq \min(T_{CP} - \Delta_{dp}, \alpha T_{CP})$$

must be met in order for the TA to be considered valid.

At 660, the UE may determine whether the CG-SDT conditions have been met. If the TA validation condition is met at 660, the UE may proceed with the transmission of the CG-SDT in the configured CG resources (in the selected SSB) at 670. If the TA validation condition is not met at 660, the UE may fall back to RACH-based SDT at 655. RACH-based SDT may comprise, for example, 2-step RA SDT or 4-step RA SDT.

Depending on whether initial op is UE or network configured, $\delta_P$ may be initialized and/or updated. $\delta_P$ may be initialized as follows:

$$\delta_P = \delta_{P,0,UE}$$

where $\delta_{P,0,UE}$ is, for example, an (initial) factory set value or a value derived/determined from a table.

Alternatively, $\delta_P$ may be initialized as follows:

$$\delta_P = \delta_{P,0,gNB}$$

where $\delta_{P,0,gNB}$ may comprise an (initial) network signaled value.

$\delta_P$ may be updated as follows:

$$\delta_P = \delta_P + \Delta\delta_{P,UE} + \Delta\delta_{P,gNB}$$

where $\Delta\delta_{P,UE}$ comprises a value/correction autonomously determined by the UE, and where $\Delta\delta_{P,gNB}$ comprises a value/correction signaled by the network. In this example, the corrections to $\delta_P$ may result from two control loops.

Upon reception of the assistance data (650 and 655 of FIG. 6), the UE may need to compute a delay range where most of the channel energy is concentrated, i.e. $\Delta_{dp}$ in FIG. 7. Example embodiments of the present disclosure may describe computation of $\Delta_{dp}$ in a noisy regime.

Referring now to FIG. 7, illustrated is an example of a power delay spread over time. The magnitude threshold (50 to be used for computing the channel power delay spread (710), and the channel power delay spread ($\Delta_{dp}$) (770), and measures of power at different points in time (740, 750, 760) are illustrated. At time 720, the UE may expect to receive the PSS/SSS associated with the serving SSB. However, the PSS/SSS associated with the serving SSB may actually be received at time 740. The difference between time 720 and time 740 may be described with the clock phase compensation ($\Delta_T$), 730.

In determining the channel power delay spread ($\Delta_{dp}$), 770, only power observed to be above the magnitude threshold ($\delta_P$), 710, may be considered. For example, the power observed at time 750 may not be considered, as the value is below the threshold 710. Accordingly, the next time at which the downlink slot will begin, 760, may be determined based on the channel power delay spread ($\Delta_{dp}$) 770, associated with the magnitude threshold ($\delta_P$), 710.

The UE may then determine that it has a valid TA only if the TA validity condition at least partially corrected with the $\Delta_{dp}(\delta_P)$ factor is met. For example, the TA validity condition may be corrected as follows:

$$|SSB\_time\_shift| \leq \min(T_{CP} - \Delta_{dp}(\delta_P), \alpha T_{CP})$$

Example embodiments of the present disclosure may relate to estimation of $\Delta_{dp}$. In an example embodiment, a transmitter may send a reference signal s(t) over a wireless channel with the following impulse response:

$$h(t) = \sum_l a_l \delta(t - \tau_l) \quad \text{(equation 1)}$$

consisting of l=1:L multipath components, where for simplicity we assume that the delay vector $\tau=[\tau_1, \ldots \tau_L]$ is ordered in ascending order. $a_l$ may comprise an amplitude/complex gain for a multipath component l. The impulse response h(t) is the superimposition of all channel multipath components, each characterized by a complex gain $a_l$ and a delay $\tau_l$. $\delta$ may describe the channel in the delay domain.

The TX signal s(t) may be sampled at a rate $T_s$ and the N samples are collected in the following vector:

$$y = s*h + w = Sa + w \quad \text{(equation 2)}$$

where the matrix $S \in C^{N \times L}$ is defined as $S(k,l) = s(kT_s - \tau_l)$, and where $a = [a_1, \ldots a_L] \in C^{L \times 1}$ comprises the tap amplitudes, and where w is additive white Gaussian noise (AWGN). The vector y (i.e. received signal) may comprise the transmit sequence s multiplied by the impulse response h plus AWGN, which may be equal to the matrix S multiplied by the set of tap amplitudes a plus AWGN.

Next, the samples y may be cross-correlated with the transmit sequence s to yield the following vector:

$$r = s \odot y = s \odot (Sa + w) = (s \odot S)a + s \odot w = Aa + \xi \quad \text{(equation 3)}$$

where A is the autocorrelation matrix of the sequence $s \in C^M$ and the noise vector $\xi = w \odot s$, and $\odot$ denotes the cross-correlation operator.

An example embodiment may involve obtaining the delay spread $\Delta_{dp}$, where the relevant power (which may be indicated by the NW via $\delta_P$) may be concentrated, i.e. according to the following:

$$\Delta_{dp} = \tau_M - \tau_m$$

where $$|h(\tau_M)|^2 = P_{max}$$

$$|h(\tau_m)|^2 \approx \frac{P_{max}}{\delta_P}$$

and $$P_{max} = \max\{|h(\tau_l)|^2, l=1:L\}$$

In an example embodiment, $\tau_m, \tau_M$ may be estimated. In an ideal scenario (i.e. noiseless and infinite bandwidth), computing $r \circ r^H$ (where $\circ$ is the Hadamard operator (i.e. elementwise multiplication)) may be enough to retrieve the min and max delays. However, in practice, this operation may return a mismatched power delay profile due to noise pollution and too coarse a sampling resolution.

Figure 8:
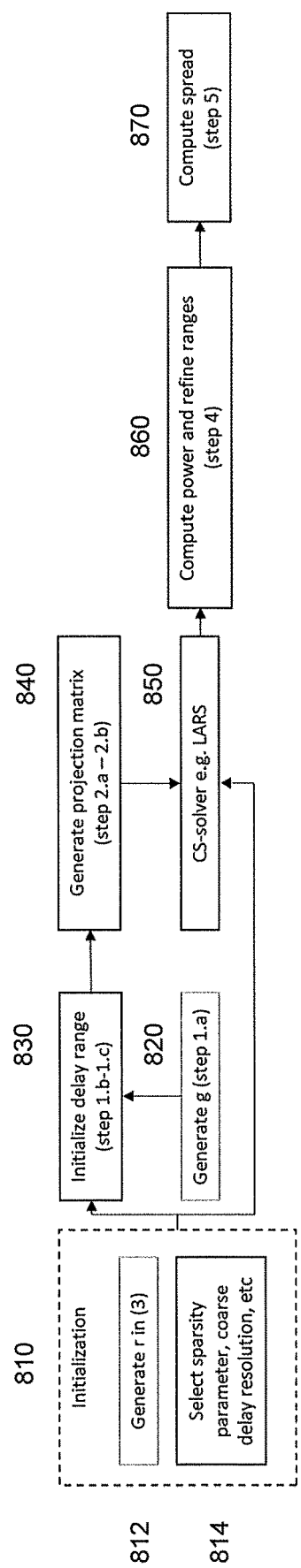
FIG. 8 is a diagram illustrating features as described herein.

Referring now to FIG. 8, illustrated is an example method for estimating $\tau_m, \tau_M$, i.e. the spread. A delay range may be initialized at 820 and 830. At 820, g may be generated: $g = r \circ r^H$. At 830, the lookup delay range may be initialized. For example, the lookup delay range $\delta_{cm}, \tau_{cM}$ may be initialized, where $g(\tau_{cM}) = P_M$ and $g(\tau_{cm}) \approx P_M/\delta p$. Additionally or alternatively, the lookup delay range may be extended by a selected $\Delta\tau$. This may be accomplished by initializing $\tau_m{}^0 = \tau_{cm} - \Delta\tau$ and $\tau_M{}^0 = T_{cM} + \Delta\tau$.

At 840, a projection matrix $\overline{A}$ may be generated by selecting a coarse delay search space resolution (d$\tau$). For example, d$\tau = oT_s$, $o \in \{10, 100\}$, $T_s = 1/(30.72 \text{ MHz}) \approx 32.6$ ns. o may be a value belonging to a set of potential values/value range used to scale the delay search space resolution. o may scale according to a subcarrier scaling factor. Then, $R = \tau_m{}^0$: d$\tau$:$\tau_M{}^0$, M=card{R}. The projection matrix $\overline{A}$ may then be generated:

$$\overline{A}(k, j) = s(kT_s - jd\tau) j \in \frac{R}{d\tau},$$

$$k = 0 : N - 1.$$

Optionally, initialization may be performed, 810. As part of 810, a vector of samples y=cross-correlated with the transmit sequence s may be generated according to the estimation model of equation 3 above. This model may be recast as $r = \overline{A}a + \xi$. Using this estimation model, and assuming h has a small number of taps, the compressive sensing (CS) problem may be solved at 850:

$$\hat{\overline{h}} = \arg\min_{\overline{a}} \frac{1}{2}\|\overline{A}\overline{a} - r\|_2^2 + \gamma\|\overline{a}\|_1 \quad \text{(equation 4)}$$

where $\gamma > 0$ is a selected sparsity parameter. A sparsity parameter, coarse delay resolution, etc. may be (optionally) selected at 814. A compressive sensing (CS)-solver, such as the least angle regression (LARS) algorithm, may be used to solve the CS problem. Other CS solvers may occur to a person of ordinary skill in the art.

At 860, the power may be computed and the ranges refined. For example, $u = \hat{h} \circ \hat{h}^H$ may be computed. Then, $\tau_{max}$ and $\tau_m$ may be selected such that $\tau_{max} = kd\tau$, where k=arg max{u(i), i=0: M−1}; and $\tau_m = cd\tau$, where c may be the smallest index for which $$u(c) \leq \frac{u(k)}{\delta p}.$$

At 870, the power delay spread ($\Delta_{dp}$) may be determined/computed and returned: $\Delta_{dp} = \tau_M - \tau_m$.

Figure 9:
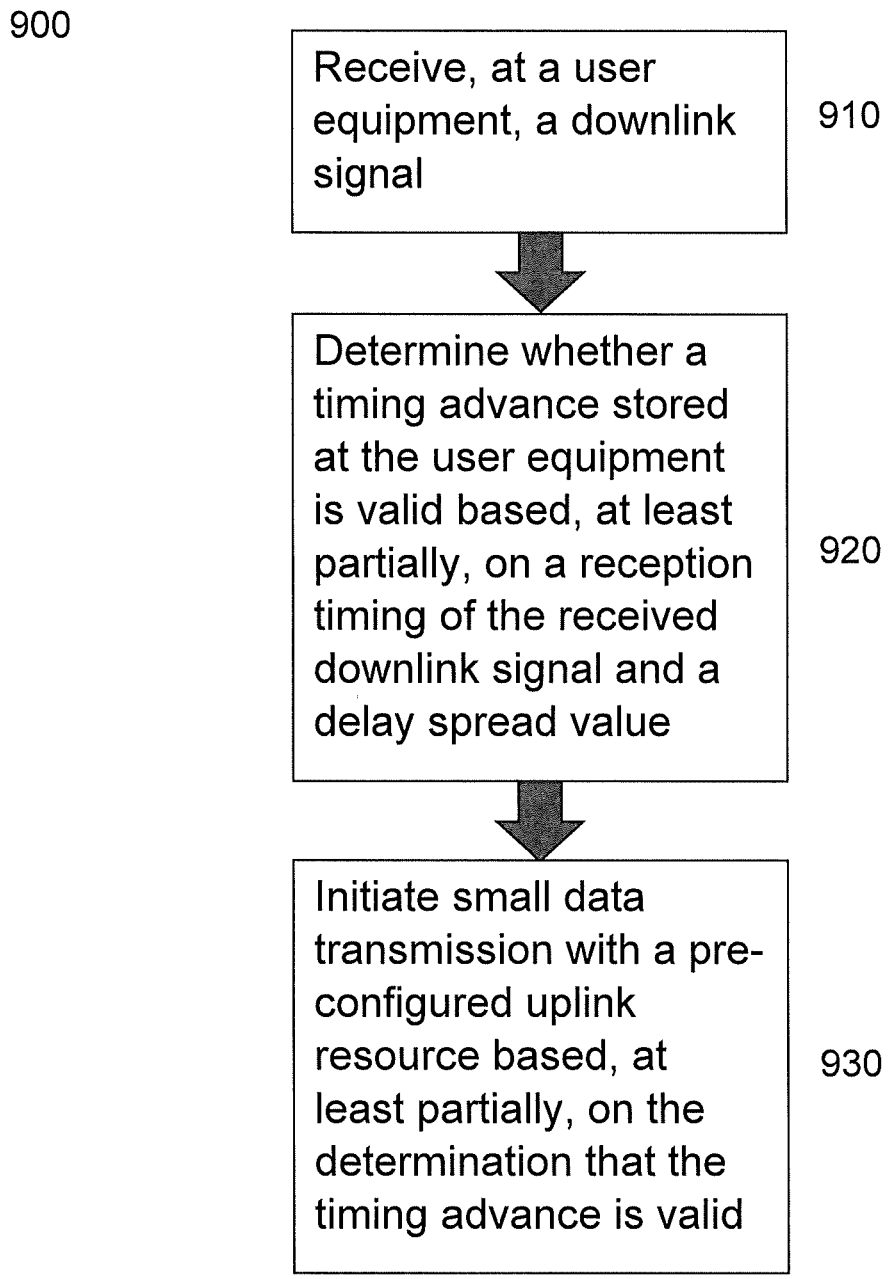
FIG. 9 is a flowchart illustrating steps as described herein.

FIG. 9 illustrates the potential steps of an example method 900. The example method 900 may include: receiving, at a user equipment, a downlink signal, 910; determining whether a timing advance stored at the user equipment is valid based, at least partially, on a reception timing of the received downlink signal and a delay spread value, 920; and initiating small data transmission with a pre-configured uplink resource based, at least partially, on the determination that the timing advance is valid, 930.

Figure 10:
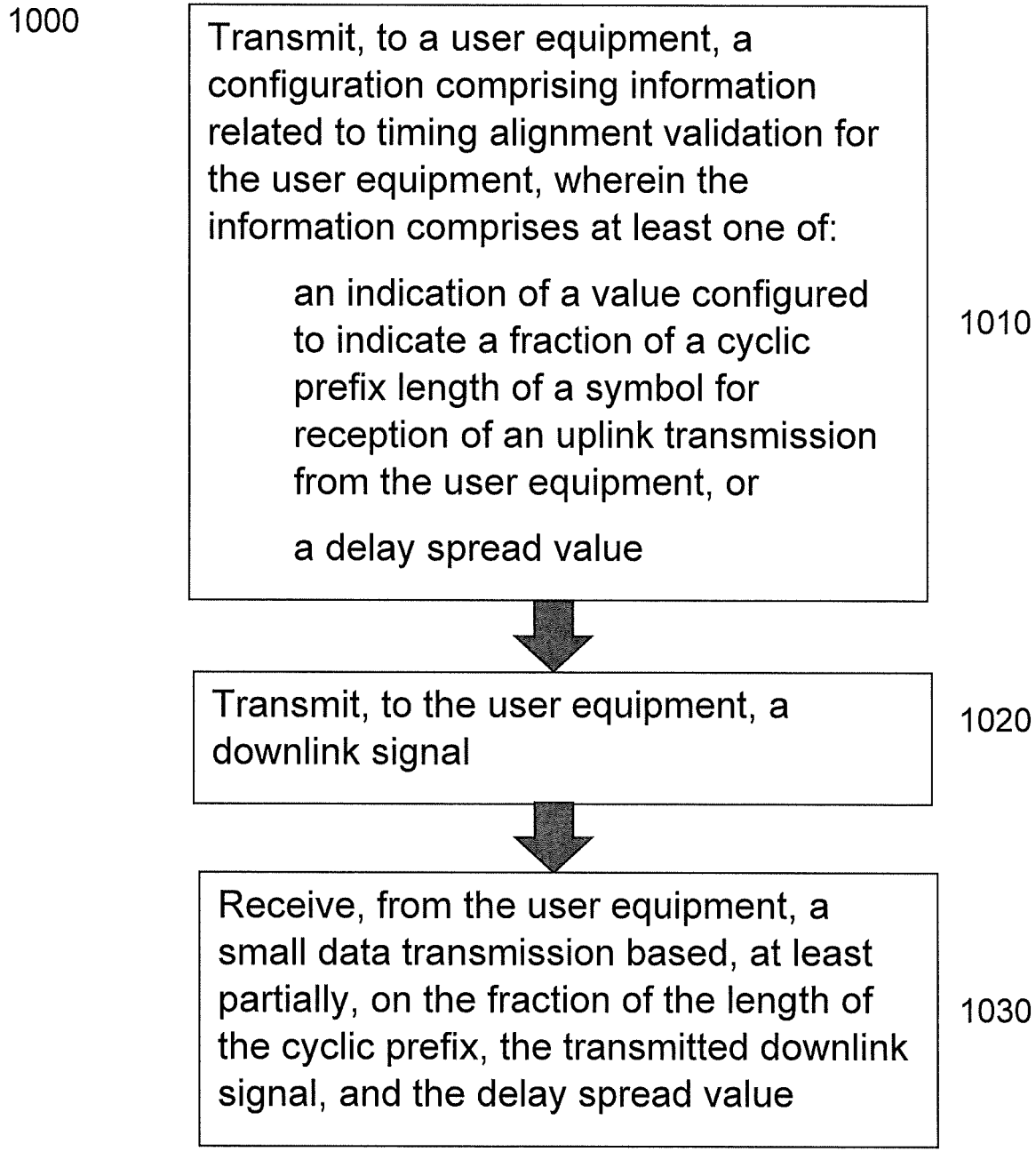
FIG. 10 is a flowchart illustrating steps as described herein.

FIG. 10 illustrates the potential steps of an example method 1000. The example method 1000 may include: transmitting, to a user equipment, a configuration comprising information related to timing alignment validation for the user equipment, wherein the information comprises at least one of: an indication of a value configured to indicate a fraction of a cyclic prefix length of a symbol for reception of an uplink transmission from the user equipment, or a delay spread value, 1010; transmitting, to the user equipment, a downlink signal, 1020; and receiving, from the user equipment, a small data transmission based, at least partially, on the fraction of the length of the cyclic prefix, the transmitted downlink signal, and the delay spread value, 1030.

A technical effect of example embodiments of the present disclosure may be that the TA validation may be robust to noise and interference conditions. A technical effect of example embodiments of the present disclosure may be that Cox Ingersoll Ross (CIR) estimates may be made available to the receiver as a byproduct. These estimates may be used for updating/retuning e.g. RX beamforming, CSI reports, etc. A technical effect of example embodiments of the present disclosure may be that the TA validation may be tunable to balance complexity vs performance, depending on the application type/accuracy requirements.

In accordance with one example embodiment, an apparatus may comprise: at least one processor; and at least one memory including computer program code; the at least one memory and the computer program code configured to, with the at least one processor, cause the apparatus to: receive a downlink signal; determine whether a timing advance stored at the apparatus is valid based, at least partially, on a reception timing of the received downlink signal and a delay spread value; and initiate small data transmission with a pre-configured uplink resource based, at least partially, on the determination that the timing advance is valid.

The example apparatus may be further configured to: compare a time shift value of the reception timing of the received downlink signal with a maximum time shift value.

The maximum time shift value may comprise a cyclic prefix length associated with a sub-carrier spacing of the pre-configured uplink resource minus the delay spread value.

The maximum time shift value may comprise a lesser one of: a cyclic prefix length associated with a sub-carrier spacing of the pre-configured uplink resource multiplied by a value configured to indicate a fraction of the cyclic prefix length, or the cyclic prefix length associated with the sub-carrier spacing of the pre-configured uplink resource minus the delay spread value.

The maximum time shift value may comprise a cyclic prefix length associated with a sub-carrier spacing of the pre-configured uplink resource multiplied by a lesser one of: one minus the delay spread value divided by the cyclic prefix length, or a value configured to indicate a fraction of the cyclic prefix length.

The example apparatus may be further configured to: determine the value configured to indicate the fraction of the cyclic prefix length, wherein determining the value configured to indicate the fraction of the cyclic prefix length may comprise the at least one memory and the computer program code are configured to, with the at least one processor, cause the apparatus to at least one of: receive a configuration, wherein the configuration may comprise an indication of the value configured to indicate a the fraction of the cyclic prefix length; or measure at least one of: a reference signal received power of a synchronization signal block of the received downlink signal, a modulation and coding scheme, a channel quality indicator, a channel state information, a signal-to-interference plus noise ratio, or a cell load observed, wherein the value configured to indicate the fraction of the cyclic prefix length may be based, at least partially, on the measuring.

The example apparatus may be further configured to: determine an initial delay search space for a time-domain signal; extend and discretize the initial delay search space; sample the extended and discretized delay search space based, at least partially, on a selected resolution; obtain a matrix based on a transmit sequence and the sampled delay search space; project the time-domain signal onto a delay-domain representation via the obtained matrix; obtain relevant power taps based on the projection and the sampled delay search space; determine a minimum power tap and a maximum power tap of the obtained relevant power taps; and determine the delay spread value based on the determined minimum power tap and the determined maximum power tap.

The example apparatus may be further configured to: determine the delay spread value based on at least one of: an initial delay search space for a time-domain signal, a resolution for defining a delay search space, a minimum power delay and a maximum power delay within a sampled delay search space, a multipath channel impulse response based on the downlink signal, an initial delay range, or a plurality of relevant power taps determined based on a cross-correlation of a vector of samples of the multipath channel impulse response and a projection matrix of the vector of samples into a delay domain.

The example apparatus may be further configured to: determine the delay spread value using an approximate channel impulse response, wherein the approximate channel impulse response may comprise a value determined based on one or more time-domain received signal samples and a projection operation, wherein the projection operation may be configured to transform at least one of the one or more time-domain received signal samples to a delay domain.

The example apparatus may be further configured to: determine a relative power delay threshold value, wherein determining the relative power delay threshold value may comprise the example apparatus may be further configured to at least one of: determine the relative power delay threshold value based on a specification of the apparatus, receive a configuration, wherein the configuration comprises an indication of the relative power delay threshold value, or measure at least one of: a reference signal received power of a synchronization signal block of the received downlink signal, a modulation and coding scheme, a channel quality indicator, a channel state information, a signal-to-interference plus noise ratio, a cell load observed, or a sub-carrier spacing, wherein the relative power delay threshold value may be based, at least partially, on the measuring.

The example apparatus may be further configured to: correct the relative power delay threshold value based on at least one of: a correction value received from a network node, or a correction value autonomously determined with the apparatus.

The delay spread value may be determined, at least partially, based on the relative power delay threshold value.

The example apparatus may be further configured to: receive a first downlink signal at a first time; determine a second time at which the downlink signal is expected to be received based, at least partially, on the first time; determine a difference between the second time and a time at which the downlink signal is received; and determine the delay spread value based on the determined difference, wherein the second downlink signal and the downlink signal may be re received with power above the relative power delay threshold value.

The example apparatus may be further configured to: determine a multipath channel impulse response using the downlink signal; determine a vector of samples of the downlink signal according to a transmit sequence; cross-correlate the determined vector of samples with the transmit sequence; initialize a delay range, wherein initializing the delay range may comprise performing elementwise multiplication of the cross-correlation of the determined vector; generate a projection matrix based on the cross-correlation of the determined vector and the initialized delay range; determine a plurality of relevant power taps based, at least partially, on the cross-correlation of the determined vector and the generated projection matrix; determine respective powers for the plurality of determined relevant power taps; determine a maximum delay value and a minimum delay value based on the determined respective powers of the plurality of determined relevant power taps; and determine the delay spread value based on the determined maximum delay value and the determined minimum delay value.

Additive white Gaussian noise may be included in the vector of samples of the impulse response according to the transmit sequence.

Determining the vector of samples of the downlink signal according to the transmit sequence may comprise the example apparatus may be further configured to: sample the downlink signal based, at least partially, on a selected sampling resolution.

Generating the projection matrix may be further based on a coarse delay search space resolution.

Determining the plurality of relevant power taps may comprise the example apparatus may be further configured to: use a compressed-sensing solver to determine the plurality of relevant power taps.

The coarse delay search space resolution may be received from a network.

Generating the projection matrix may comprise the example apparatus being further configured to determine a minimum delay of the initialized delay range; determine a maximum delay of the initialized delay range; and generate the projection matrix based on the determined minimum delay minus a selected delay value, and the determined maximum delay plus the selected delay value.

The example apparatus may be further configured to: determine the delay spread value, wherein determining the delay spread value may comprise the apparatus being further configured to: determine an initial delay spread via cross-correlation-based power detection; and refine the initial delay spread to determine the delay spread value via a compressed-sensing solver, wherein the compressed-sensing solver may be configured to: select a delay search space based on the initial delay spread, and use a projection matrix to map one or more received signals onto the selected delay search space.

In accordance with one example embodiment, an apparatus may comprise: circuitry configured to perform: receive a downlink signal; determine whether a timing advance stored at the apparatus is valid based, at least partially, on a reception timing of the received downlink signal and a delay spread value; and initiate small data transmission with a pre-configured uplink resource based, at least partially, on the determination that the timing advance is valid.

In accordance with one example embodiment, an apparatus may comprise: processing circuitry; memory circuitry including computer program code, the memory circuitry and the computer program code configured to, with the processing circuitry, enable the apparatus to: receive a downlink signal; determine whether a timing advance stored at the apparatus is valid based, at least partially, on a reception timing of the received downlink signal and a delay spread value; and initiate small data transmission with a pre-configured uplink resource based, at least partially, on the determination that the timing advance is valid.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one aspect, an example method may be provided comprising: receiving, at a user equipment, a downlink signal; determining whether a timing advance stored at the user equipment is valid based, at least partially, on a reception timing of the received downlink signal and a delay spread value; and initiating small data transmission with a pre-configured uplink resource based, at least partially, on the determination that the timing advance is valid.

In accordance with one example embodiment, an apparatus may comprise means for performing: receiving a downlink signal; determining whether a timing advance stored at the apparatus is valid based, at least partially, on a reception timing of the received downlink signal and a delay spread value; and initiating small data transmission with a pre-configured uplink resource based, at least partially, on the determination that the timing advance is valid.

In accordance with one example embodiment, a non-transitory computer-readable medium comprising program instructions stored thereon which, when executed with at least one processor, cause the at least one processor to: receive a downlink signal; determine whether a timing advance stored at a user equipment is valid based, at least partially, on a reception timing of the received downlink signal and a delay spread value; and initiate small data transmission with a pre-configured uplink resource based, at least partially, on the determination that the timing advance is valid.

In accordance with another example embodiment, a non-transitory program storage device readable by a machine may be provided, tangibly embodying a program of instructions executable by the machine for performing operations, the operations comprising: receiving a downlink signal; determining whether a timing advance stored at a user equipment is valid based, at least partially, on a reception timing of the received downlink signal and a delay spread value; and initiating small data transmission with a pre-configured uplink resource based, at least partially, on the determination that the timing advance is valid.

In accordance with one example embodiment, an apparatus may comprise: at least one processor; and at least one memory including computer program code; the at least one memory and the computer program code configured to, with the at least one processor, cause the apparatus to: transmit, to a user equipment, a configuration comprising information related to timing alignment validation for the user equipment, wherein the information may comprise at least one of: an indication of a value configured to indicate a fraction of a cyclic prefix length of a symbol for reception of an uplink transmission from the user equipment, or a delay spread value; transmit, to the user equipment, a downlink signal; and receive, from the user equipment, a small data transmission based, at least partially, on the fraction of the length of the cyclic prefix, the transmitted downlink signal, and the delay spread value.

The example apparatus may be further configured to: transmit, to the user equipment, at least one of: a relative power delay threshold value, or a correction value for determining the relative power delay threshold value.

The example apparatus may be further configured to: determine a characteristic of a channel, wherein the channel may be used for communication with the user equipment; and determine the fraction of the cyclic prefix length of the symbol for reception of the uplink transmission from the user equipment based, at least partially, on the determined characteristic of the channel.

In accordance with one example embodiment, an apparatus may comprise: circuitry configured to perform: transmit, to a user equipment, a configuration comprising information related to timing alignment validation for the user equipment, wherein the information may comprise at least one of: an indication of a value configured to indicate a fraction of a cyclic prefix length of a symbol for reception of an uplink transmission from the user equipment, or a delay spread value; transmit, to the user equipment, a downlink signal; and receive, from the user equipment, a small data transmission based, at least partially, on the fraction of the length of the cyclic prefix, the transmitted downlink signal, and the delay spread value.

In accordance with one example embodiment, an apparatus may comprise: processing circuitry; memory circuitry including computer program code, the memory circuitry and the computer program code configured to, with the processing circuitry, enable the apparatus to: transmit, to a user equipment, a configuration comprising information related to timing alignment validation for the user equipment, wherein the information may comprise at least one of: an indication of a value configured to indicate a fraction of a cyclic prefix length of a symbol for reception of an uplink transmission from the user equipment, or a delay spread value; transmit, to the user equipment, a downlink signal; and receive, from the user equipment, a small data transmission based, at least partially, on the fraction of the length of the cyclic prefix, the transmitted downlink signal, and the delay spread value.

In accordance with one aspect, an example method may be provided comprising: transmitting, to a user equipment, a configuration comprising information related to timing alignment validation for the user equipment, wherein the information may comprise at least one of: an indication of a value configured to indicate a fraction of a cyclic prefix length of a symbol for reception of an uplink transmission from the user equipment, or a delay spread value; transmitting, to the user equipment, a downlink signal; and receiving, from the user equipment, a small data transmission based, at least partially, on the fraction of the length of the cyclic prefix, the transmitted downlink signal, and the delay spread value.

In accordance with one example embodiment, an apparatus may comprise means for performing: transmitting, to a user equipment, a configuration comprising information related to timing alignment validation for the user equipment, wherein the information may comprise at least one of: an indication of a value configured to indicate a fraction of a cyclic prefix length of a symbol for reception of an uplink transmission from the user equipment, or a delay spread value; transmitting, to the user equipment, a downlink signal; and receiving, from the user equipment, a small data transmission based, at least partially, on the fraction of the length of the cyclic prefix, the transmitted downlink signal, and the delay spread value.

In accordance with one example embodiment, a non-transitory computer-readable medium comprising program instructions stored thereon which, when executed with at least one processor, cause the at least one processor to: transmit, to a user equipment, a configuration comprising information related to timing alignment validation for the user equipment, wherein the information may comprise at least one of: an indication of a value configured to indicate a fraction of a cyclic prefix length of a symbol for reception of an uplink transmission from the user equipment, or a delay spread value; transmit, to the user equipment, a downlink signal; and receive, from the user equipment, a small data transmission based, at least partially, on the fraction of the length of the cyclic prefix, the transmitted downlink signal, and the delay spread value.

In accordance with another example embodiment, a non-transitory program storage device readable by a machine may be provided, tangibly embodying a program of instructions executable by the machine for performing operations, the operations comprising: transmitting, to a user equipment, a configuration comprising information related to timing alignment validation for the user equipment, wherein the information may comprise at least one of: an indication of a value configured to indicate a fraction of a cyclic prefix length of a symbol for reception of an uplink transmission from the user equipment, or a delay spread value; transmitting, to the user equipment, a downlink signal; and receiving, from the user equipment, a small data transmission based, at least partially, on the fraction of the length of the cyclic prefix, the transmitted downlink signal, and the delay spread value.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus, comprising:
   at least one processor; and
   at least one non-transitory memory storing instructions that, when executed with the at least one processor, cause the apparatus to:
   receive a downlink signal;
   determine whether a timing advance stored at the apparatus is valid based, at least partially, on a reception timing of the received downlink signal and a delay spread value; and
   initiate small data transmission with a pre-configured uplink resource based, at least partially, on the determination that the timing advance is valid.

2. The apparatus of claim 1, wherein the instructions, when executed with the at least one processor, cause the apparatus to compare a time shift value of the reception timing of the received downlink signal with a maximum time shift value.

3. The apparatus of claim 2, wherein the maximum time shift value comprises a cyclic prefix length associated with a sub-carrier spacing of the pre-configured uplink resource minus the delay spread value.

4. The apparatus of claim 2, wherein the maximum time shift value comprises a lesser one of:
   a cyclic prefix length associated with a sub-carrier spacing of the pre-configured uplink resource multiplied with a value configured to indicate a fraction of the cyclic prefix length, or
   the cyclic prefix length associated with the sub-carrier spacing of the pre-configured uplink resource minus the delay spread value.

5. The apparatus of claim 2, wherein the maximum time shift value comprises a cyclic prefix length associated with a sub-carrier spacing of the pre-configured uplink resource multiplied with a lesser one of:
   one minus the delay spread value divided with the cyclic prefix length, or
   a value configured to indicate a fraction of the cyclic prefix length.

6. The apparatus of claim 4, wherein the instructions, when executed with the at least one processor, cause the apparatus to at least one of:
   receive a configuration, wherein the configuration comprises an indication of the value configured to indicate the fraction of the cyclic prefix length; or
   measure at least one of:
      a reference signal received power of a synchronization signal block of the received downlink signal,
      a modulation and coding scheme,
      a channel quality indicator,
      a channel state information,
      a signal-to-interference plus noise ratio, or
      a cell load observed,
   wherein the value configured to indicate the fraction of the cyclic prefix length is based, at least partially, on the measuring.

7. The apparatus of claim 1, wherein the instructions, when executed with the at least one processor, cause the apparatus to determine the delay spread value based on at least one of:
   an initial delay search space for a time-domain signal,
   a resolution for defining a delay search space, a minimum power delay and a maximum power delay within a sampled delay search space,
a multipath channel impulse response based on the received downlink signal,
an initial delay range, or
a plurality of relevant power taps determined based on a cross-correlation of a vector of samples of the multipath channel impulse response and a projection matrix of the vector of samples into a delay domain.

8. The apparatus of claim 1, wherein the instructions, when executed with the at least one processor, cause the apparatus to
determine the delay spread value using a channel impulse response, wherein the channel impulse response comprises a value determined based on one or more time-domain received signal samples and a projection operation, wherein the projection operation is configured to transform at least one of the one or more time-domain received signal samples to a delay domain.

9. The apparatus of claim 1, wherein the instructions, when executed with the at least one processor, cause the apparatus to at least one of:
determine a relative power delay threshold value based on a specification of the apparatus;
receive a configuration, wherein the configuration comprises an indication of the relative power delay threshold value; or
measure at least one of:
a reference signal received power of a synchronization signal block of the received downlink signal,
a modulation and coding scheme,
a channel quality indicator,
a channel state information,
a signal-to-interference plus noise ratio,
a cell load observed, or
a sub-carrier spacing,
wherein the relative power delay threshold value is based, at least partially, on the measuring.

10. The apparatus of claim 9, wherein the instructions, when executed with the at least one processor, cause the apparatus to correct the relative power delay threshold value based on at least one of:
a correction value received from a network node, or
a correction value autonomously determined with the apparatus.

11. The apparatus of claim 9 or 10, wherein the delay spread value is determined, at least partially, based on the relative power delay threshold value.

12. The apparatus of claim 11, wherein the instructions, when executed with the at least one processor, cause the apparatus to:
receive a first downlink signal at a first time;
determine a second time at which the downlink signal is expected to be received based, at least partially, on the first time;
determine a difference between the second time and a time at which the downlink signal is received; and
determine the delay spread value based on the determined difference, wherein the first downlink signal and the downlink signal are received with power above the relative power delay threshold value.

13. The apparatus of claim 1, wherein the instructions, when executed with the at least one processor, cause the apparatus to:
determine a multipath channel impulse response using the received downlink signal;
determine a vector of samples of the received downlink signal according to a transmit sequence;
cross-correlate the determined vector of samples with the transmit sequence;
initialize a delay range, wherein initializing the delay range comprises performing elementwise multiplication of the cross-correlation of the determined vector;
generate a projection matrix based on the cross-correlation of the determined vector and the initialized delay range;
determine a plurality of relevant power taps based, at least partially, on the cross-correlation of the determined vector and the generated projection matrix;
determine respective powers for the plurality of determined relevant power taps;
determine a maximum delay value and a minimum delay value based on the determined respective powers of the plurality of determined relevant power taps; and
determine the delay spread value based on the determined maximum delay value and the determined minimum delay value.

14. The apparatus of claim 13, wherein the instructions, when executed with the at least one processor, cause the apparatus to sample the received downlink signal based, at least partially, on a selected sampling resolution.

15. The apparatus of claim 13, wherein generating the projection matrix is further based on a coarse delay search space resolution.

16. The apparatus of claim 13, wherein the instructions, when executed with the at least one processor, cause the apparatus to
use a compressed-sensing solver to determine plurality of relevant power taps.

17. A method comprising:
receiving, at a user equipment, a downlink signal;
determining whether a timing advance stored at the user equipment is valid based, at least partially, on a reception timing of the received downlink signal and a delay spread value; and
initiating small data transmission with a pre-configured uplink resource based, at least partially, on the determination that the timing advance is valid.

18. An apparatus, comprising:
at least one processor; and
at least one non-transitory memory storing instructions that, when executed with the at least one processor, cause the apparatus to:
transmit, to a user equipment, a configuration comprising information related to timing alignment validation for the user equipment, wherein the information comprises at least one of:
an indication of a value configured to indicate a fraction of a cyclic prefix length of a symbol for reception of an uplink transmission from the user equipment, or
a delay spread value;
transmit, to the user equipment, a downlink signal; and
receive, from the user equipment, a small data transmission based, at least partially, on the fraction of the length of the cyclic prefix, the transmitted downlink signal, and the delay spread value.

19. The apparatus of claim 18, wherein the instructions, when executed with the at least one processor, cause the apparatus to: transmit, to the user equipment, at least one of:
a relative power delay threshold value, or
a correction value for determining the relative power delay threshold value.

20. The apparatus of claim 18, wherein the instructions, when executed with the at least one processor, cause the apparatus to:
- determine a characteristic of a channel, wherein the channel is used for communication with the user equipment; and
- determine the fraction of the cyclic prefix length of the symbol for reception of the uplink transmission from the user equipment based, at least partially, on the determined characteristic of the channel.

21. A method comprising:
- transmitting, to a user equipment, a configuration comprising information related to timing alignment validation for the user equipment, wherein the information comprises at least one of:
  - an indication of a value configured to indicate a fraction of a cyclic prefix length of a symbol for reception of an uplink transmission from the user equipment, or
  - a delay spread value;
- transmitting, to the user equipment, a downlink signal; and
- receiving, from the user equipment, a small data transmission based, at least partially, on the fraction of the length of the cyclic prefix, the transmitted downlink signal, and the delay spread value.

* * * * *